US012804755B2

(12) United States Patent
Yang

(10) Patent No.: US 12,804,755 B2
(45) Date of Patent: Nov. 17, 2026

(54) COMMUNICATION METHOD AND APPARATUS, NETWORK DEVICE, UE, AND STORAGE MEDIUM

(71) Applicant: Beijing Xiaomi Mobile Software Co., Ltd., Beijing (CN)

(72) Inventor: Xing Yang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 495 days.

(21) Appl. No.: 18/044,362

(22) PCT Filed: Sep. 17, 2020

(86) PCT No.: PCT/CN2020/115980

§ 371 (c)(1),
(2) Date: Mar. 7, 2023

(87) PCT Pub. No.: WO2022/056788

PCT Pub. Date: Mar. 24, 2022

(65) Prior Publication Data

US 2023/0328795 A1 Oct. 12, 2023

(51) Int. Cl.
*H04W 76/20* (2018.01)
*H04B 17/318* (2015.01)
(Continued)

(52) U.S. Cl.
CPC .......... *H04W 76/20* (2018.02); *H04B 17/328* (2023.05); *H04W 74/0833* (2013.01); *H04W 74/0836* (2024.01)

(58) Field of Classification Search
CPC ............. H04W 74/0833; H04W 76/20; H04W 74/0836; H04W 74/006; H04W 52/0212; H04W 72/54; H04W 76/27; H04W 72/542; H04W 74/002; H04B 17/328; Y02D 30/70; H04L 5/0048
See application file for complete search history.

(56) References Cited

U.S. PATENT DOCUMENTS

2012/0208545 A1* 8/2012 Yang .................. H04W 74/002
455/450
2014/0241397 A1* 8/2014 Hashimoto ............ G01K 1/024
374/170
(Continued)

FOREIGN PATENT DOCUMENTS

CN 110139365 A 8/2019
CN 111278157 A 6/2020
(Continued)

OTHER PUBLICATIONS

International Search Report and Written Opinion of International Application No. PCT/CN2020/115980, dated Jun. 4, 2021, 14 pages.
(Continued)

*Primary Examiner* — Steven Hieu D Nguyen
(74) *Attorney, Agent, or Firm* — Finnegan, Henderson, Farabow, Garrett & Dunner, L.L.P.

(57) ABSTRACT

A communication method is applied to a base station side, and includes: sending configuration information to a user equipment (UE), the configuration information being configured to indicate at least one of: a random access mode or a data bearing mode under a random access scenario.

18 Claims, 3 Drawing Sheets

(51) Int. Cl.
*H04W 74/0833* (2024.01)
*H04W 74/0836* (2024.01)

(56) References Cited

U.S. PATENT DOCUMENTS

| | | | | |
|---|---|---|---|---|
| 2014/0334380 | A1* | 11/2014 | Pinheiro | H04B 7/0452 370/328 |
| 2017/0251516 | A1 | 8/2017 | Bangolae et al. | |
| 2018/0077696 | A1* | 3/2018 | Lee | H04W 72/02 |
| 2018/0139778 | A1* | 5/2018 | Chou | H04W 76/27 |
| 2019/0320467 | A1* | 10/2019 | Freda | H04L 5/0055 |
| 2020/0120713 | A1 | 4/2020 | Yerramalli et al. | |
| 2020/0252967 | A1 | 8/2020 | Ozturk et al. | |
| 2020/0305014 | A1* | 9/2020 | Kim | H04W 24/10 |
| 2022/0007423 | A1* | 1/2022 | Agiwal | H04W 74/0833 |
| 2022/0046749 | A1* | 2/2022 | Lin | H04W 76/30 |
| 2023/0199857 | A1* | 6/2023 | Cao | H04W 74/002 370/329 |
| 2023/0284329 | A1* | 9/2023 | Agiwal | H04W 76/27 370/331 |
| 2023/0319890 | A1* | 10/2023 | Wang | H04W 76/28 370/329 |

FOREIGN PATENT DOCUMENTS

| | | | |
|---|---|---|---|
| CN | 111385909 | A | 7/2020 |
| WO | WO 2018031603 | A1 | 2/2018 |
| WO | WO 2018064367 | A1 | 4/2018 |

OTHER PUBLICATIONS

European Patent Office, Extended European Search Report issued in Application No. 20953646.5, dated Oct. 4, 2023, 10 pages.
Examination Report for India Application No. 202347027333, issued on Nov. 9, 2023, 6 pages.
The First Office for Chinese Application No. 202080002332.7, issued on Oct. 8, 2022.
The Second Office for Chinese Application No. 202080002332.7, issued on Apr. 29, 2023.
Office Action for Indian Application No. 202347027333, dated Jan. 29, 2026, 2 pages.
European Search Report for European Application No. 20 953 646.5, dated Dec. 23, 2025, 6 pages.

* cited by examiner

COMMUNICATION METHOD AND APPARATUS, NETWORK DEVICE, UE, AND STORAGE MEDIUM

CROSS REFERENCE TO RELATED APPLICATION

The present application is the U.S. National Stage Application of International Application No. PCT/CN2020/115980 filed on Sep. 17, 2020, the entire content of which is incorporated herein by reference.

TECHNICAL FIELD

The disclosure relates to a data transmission technology, in particular to a communication method and apparatus, a network device, a user equipment (UE), and a storage medium.

BACKGROUND

In an NR, an inactive state is introduced. In this state, UE is allowed to directly carry encrypted data during random access process to send to a base station, and the UE does not need to enter a connected state, which reduces transmission delay and signaling overhead. Because the volume of data able to be sent during the random access process is smaller, this data sending mode is suitable for sending small data packets, so this data sending mode is called small data transmission.

SUMMARY

According to a first aspect of an example of the disclosure, a communication method is provided and applied to a base station side. The method includes:

sending configuration information to a UE, the configuration information being configured to indicate at least one of following: a random access mode and a data bearing mode under a random access scenario.

According to a second aspect of an example of the disclosure, a communication method is provided and applied to a user equipment side. The method includes:

receiving configuration information;

measuring channel quality; and determining, according to the configuration information, a small data transmission threshold value corresponding to the channel quality.

According to a third aspect of an example of the disclosure, a network device is provided, including a processor, a transceiver, a memory and an executable program stored on the memory and able to be operated by the processor, and the processor is configured to:

send configuration information to a user equipment (UE), the configuration information being configured to indicate at least one of following: a random access mode and a data bearing mode under a random access scenario.

According to a fourth aspect of an example of the disclosure, a user equipment is provided, including a processor, a transceiver, and a memory storing an executable program, and the processor, when operating the executable program, performs the communication method in the second aspect.

According to a fifth aspect of an example of the disclosure, a non-transitory storage medium is provided, on which an executable program is stored, and the executable program, when executed by a processor, performs the communication method in the first aspect.

According to a sixth aspect of an example of the disclosure, a non-transitory storage medium is provided, on which an executable program is stored, and the executable program, when executed by a processor, performs the communication method in the second aspect.

BRIEF DESCRIPTION OF THE DRAWINGS

Accompanying drawings are incorporated into the specification and constitute one part of the specification, show examples conforming to the disclosure and are used to explain principles of the examples of the disclosure together with the specification.

DETAILED DESCRIPTION

In a current small data transmission mechanism, a threshold for the volume of data able to be carried during random access process is configured by a network side for the UE and is all consistent in a cell. For this reason, a lower data transmission threshold needs to be set according to a worst channel condition, so as to ensure uplink coverage. The UE in an area with a good channel condition may send more data during random access process, possibly resulting in performing a needless radio resource control (RRC) connection recovery process by many UE based on the current small data transmission mechanism. For this purpose, examples of the disclosure provide a communication method and apparatus, a network device, a user equipment, and a storage medium.

Examples will be illustrated in detail here and shown in the accompanying drawings. When following description is related to the accompanying drawings, unless otherwise indicated, same numbers in the different accompanying drawings represent same or similar elements. Described implementations in the following examples do not represent all implementations consistent with the examples of the disclosure. On the contrary, they are instances of apparatus and methods consistent with some aspects of the examples of the disclosure as detailed in attached claims.

Terms used in the examples of the disclosure are for the purpose of describing specific examples and are not aimed at limiting the examples of the disclosure. Words "one", "said and "the" of singular forms used in the examples of the disclosure and the attached claims are also aimed at including most forms, unless the context clearly shows other meanings. It needs also to be understood that terms "and/or" used in the disclosure refer to and include any or all possible combinations of one or a plurality of relevant listed items.

It needs to be understood that although terms of first, second, third, etc. may be adopted to describe various pieces of information in the examples of the disclosure, the information is not limited to these terms. These terms are used to distinguish the same type of information from one another. For example, under the condition of not departing from the scope of the examples of the disclosure, first information also may be called second information, and similarly, the second information also may be called the first information. Depending on the context, for example, the word "if" used here may be explained as "at the time of" or "when" or "in response to determining".

Figure 1:
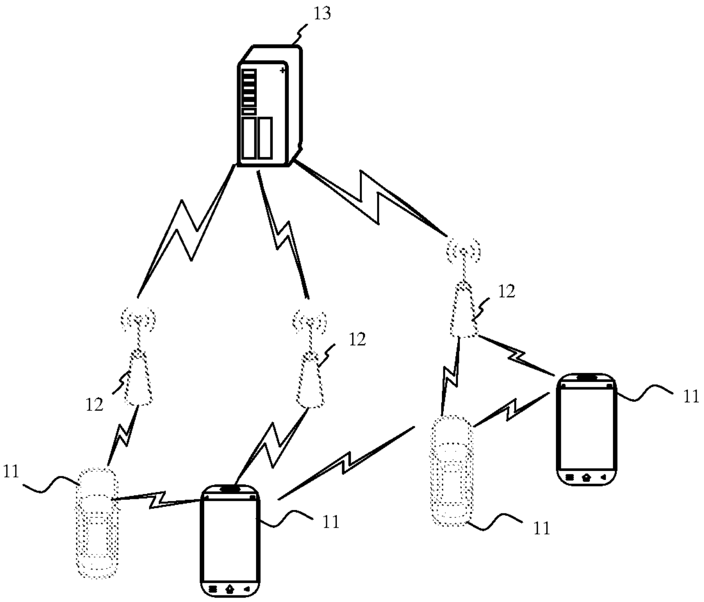
FIG. 1 is a schematic structural diagram of a wireless communication system according to an example.

Please refer to FIG. 1, which shows a schematic structural diagram of a wireless communication system provided by an example of the disclosure. As shown in FIG. 1, the wireless communication system is a communication system based on a cellular mobile communication technology. The wireless communication system may include a plurality of terminals 11 and a plurality of base stations 12.

The terminals 11 may refer to devices providing voice and/or data connectivity for a user. The terminals 11 may communicate with one or more core networks via a radio access network (RAN), and the terminals 11 may be Internet of Things terminals, such as sensor devices and mobile phones (or called "cellular" phones), and computers with the Internet of Things terminals, for example, may be stationary, portable, pocket, handheld, computer built-in, or vehicle-mounted apparatuses. For example, it may be a station (STA), a subscriber unit, a subscriber station, a mobile station, a mobile, a remote station, an access point, a remote terminal, an access terminal, a user terminal, a user agent, a user device or user equipment (UE). Or, the terminals 11 may also be devices of unmanned aerial vehicles. Or, the terminals 11 may also be vehicle-mounted devices, for example, may be trip computers with a wireless communication function or wireless communication devices externally connected with the trip computers. Or, the terminals 11 may also be road-side devices, for example, may be street lamps, signal lamps or other road-side devices with a wireless communication function.

The base stations 12 may be network side devices in the wireless communication system. The wireless communication system may be the 4th generation mobile communication (4G) system, also called a long term evolution (LTE) system; or the wireless communication system may also be a 5G system, also called a new radio (NR) system or a 5G NR system. Or, the wireless communication system may also be an any-generation system. An access network in the 5G system may be called a new generation-radio access network (NG-RAN), or an MTC system.

The base stations 12 may be evolution base stations (eNB) adopted in the 4G system. Or, the base stations 12 may also be base stations (gNB) adopting a centralized distributed architecture in the 5G system. When the base stations 12 adopt the centralized distributed architecture, the base stations generally include a central unit (CU) and at least two distributed units (DU). Protocol stacks of a packet data convergence protocol (PDCP) layer, a radio link control (RLC) layer and a media access control (MAC) layer are set in the central unit; and a physical (PHY) layer protocol stack is set in each distributed unit. Specific implementations of the base stations 12 are not limited by the examples of the disclosure.

A wireless connection may be built between the base stations 12 and the terminals 11 through wireless air interfaces. In different implementations, the wireless air interfaces are wireless air interfaces based on the 4th generation mobile communication network technology (4G) standard; or the wireless air interfaces are wireless air interfaces based on the 5th generation mobile communication network technology (5G) standard, for example, the wireless air interfaces are new radios; or the wireless air interfaces may also be wireless air interfaces based on the standard of a mobile communication network technology of a next generation of the 5G.

In some examples, an end to end (E2E) connection may also be built between the terminals 11, for example, vehicle to vehicle (V2V) communication, vehicle to infrastructure (V2I) communication and vehicle to pedestrian (V2P) communication and other scenarios in vehicle to everything (V2X).

In some examples, the wireless communication system may further include a network management device 13.

The plurality of base stations 12 are respectively connected with the network management device 13, and the network management device 13 may be a core network device in the wireless communication system. For example, the network management device 13 may be a mobility management entity (MME) in an evolved packet core (EPC). Or the network management device may also be other core network devices, such as a serving gateway (SGW), a public data network gateway (PGW), a policy and charging rules function (PCRF) or a home subscriber server (HSS). For an implementation form of the network management device 13, the examples of the disclosure do not make a limitation.

Executive bodies involved in the examples of the disclosure include, but not limited to, the user equipment (UE) in a cellular mobile communication system, the base stations of cellular mobile communication, etc.

Figure 2:
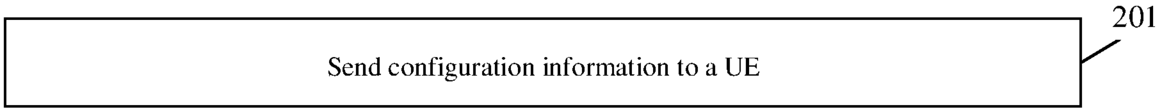
FIG. 2 is a schematic flow diagram of a communication method according to an example.

FIG. 2 is a schematic flow diagram of a communication method according to an example, and as shown in FIG. 2, the communication method of the example of the disclosure includes following processing steps:

step 201, configuration information is sent to a UE.

The configuration information is configured to indicate at least one of following: a random access mode and a data bearing mode under a random access scenario.

A network side device, such as a base station, sends the configuration information to the UE in an inactive state through a system message, so as to cause the UE in the inactive state to be able to transmit uplink data in the random access mode. In the example of the disclosure, the configuration information is also suitable for the UE in a connected state, specifically, the configuration information may be sent to the UE through an RRC message, and at the moment, after the configuration information is received through the RRC message, the configuration information sent through the system message will be ignored when the UE is in the inactive state again.

The communication method of the example of the disclosure is applied to a network device side, for example, applied to the base station.

The configuration information includes at least one of following:

- a correlation between channel quality and a data threshold value, the channel quality includes parameters, such as reference signal receiving power (RSRP). As an instance, when the RSRP is greater than −98 db, a data threshold is set as 100 kb; when the RSRP is less than −98 db and greater than −108 db, the data threshold is set as 80 kb; and when the RSRP is less than −108 db, the data threshold is set as 50 kb. Those skilled in the art need to understand that this is an instance of a possible implementation, and according to different RSRP, different data thresholds are set, which shall be within the essence of the technical solution of the disclosure. For example, it may also be that when the RSRP is greater than −90 db, the data threshold is set as 120 kb; when the RSRP is less than −90 db and greater than −110 db, the data threshold is set as 70 kb; and when the RSRP is less than −110 db, the data threshold is set as 45 kb.

A corresponding relation between a random access preamble and a small data bearing volume, as an instance, preambles 1-10 correspond to a small data bearing threshold of 100 kb, preambles 11-20 correspond to a small data bearing threshold of 80 kb, preambles 21-30 correspond to a small data bearing threshold of 50 kb, and preambles 31-40 correspond to a small data bearing threshold of 20 kb. As an instance, it may also be: preambles 1-10 correspond to a small data bearing threshold of 110 kb, preambles 11-20 correspond to a small data bearing threshold of 90 kb, preambles 21-30 correspond to a small data bearing threshold of 60 kb, and preambles 31-40 correspond to a small data bearing threshold of 30 kb.

A logic channel adopting a two-step or four-step random access mode.

In the example of the disclosure, sending the configuration information includes: the configuration information is sent through a system broadcast message.

Or, when the UE is in the connected state, the configuration information is sent through a radio resource control (RRC) message; and after the configuration information has been sent through the RRC message, when the UE enters into an inactive state again, the configuration information received through the RRC message prevails, and the configuration information sent through the broadcast message is ignored.

Figure 3:
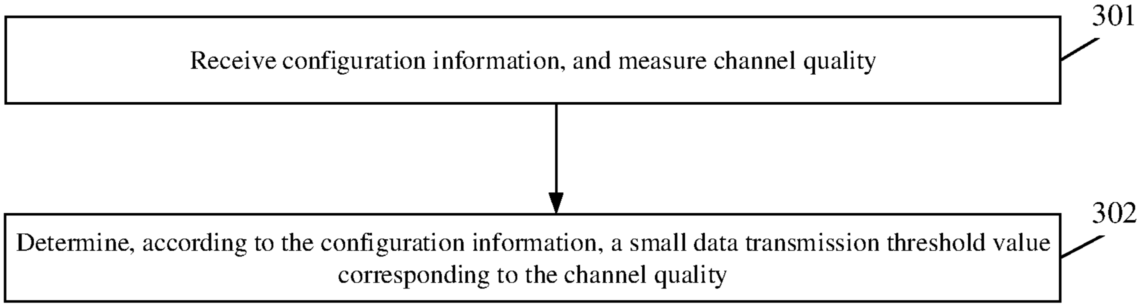
FIG. 3 is a schematic flow diagram of a communication method according to an example.

FIG. 3 is a schematic flow diagram of a communication method according to an example. As shown in FIG. 3, the communication method of the example of the disclosure includes following processing steps:

step 301, configuration information is received, and channel quality is measured.

The communication method of the example of the disclosure is suitable for a UE side. In this step, configuration information receiving and channel quality measuring have no sequence and may be performed in parallel.

When UE receives the configuration information sent by a network side, a small data transmission threshold value in a current UE random access mode is determined according to the channel quality currently measured.

Step 302, the small data transmission threshold value corresponding to the channel quality is determined according to the configuration information.

Specifically, the small data transmission threshold value may be determined according to RSRP. As an instance, when the RSRP is greater than −98 db, a data threshold is set as 100 kb; when the RSRP is less than −98 db and greater than −108 db, the data threshold is set as 80 kb; and when the RSRP is less than −108 db, the data threshold is set as 50 kb. Or, when the RSRP is greater than −90 db, the data threshold is set as 120 kb; when the RSRP is less than −90 db and greater than −110 db, the data threshold is set as 70 kb; and when the RSRP is less than −110 db, the data threshold is set as 45 kb.

Or, the small data transmission threshold value is determined according to the corresponding relation between a random access preamble and a small data bearing volume. As an instance, preambles 1-10 correspond to a small data bearing threshold of 100 kb, preambles 11-20 correspond to a small data bearing threshold of 80 kb, preambles 21-30 correspond to a small data bearing threshold of 50 kb, and preambles 31-40 correspond to a small data bearing threshold of 20 kb. Or, it may also be: preambles 1-10 correspond to a small data bearing threshold of 110 kb, preambles 11-20 correspond to a small data bearing threshold of 90 kb, preambles 21-correspond to a small data bearing threshold of 60 kb, and preambles 31-40 correspond to a small data bearing threshold of 30 kb.

When uplink data needs to be transmitted, and when it is determined that a media access control protocol data unit (MAC PDU) needing to bear the uplink data is less than or equal to the small data transmission threshold value, the uplink data is sent through a small data sending mechanism in a random access mode, and when it is determined that when the MAC PDU needing to bear the uplink data is greater than the small data transmission threshold value, an RRC connection establishment process is triggered. In the example of the disclosure, whether the MAC PDU needing to bear an uplink data volume needing to be sent is less than or equal to a current small data transmission threshold value is determined, if the MAC PDU is less than or equal to the current small data transmission threshold value, it indicates that the MAC PDU may bear the current uplink data to be sent in a current uplink random access mode; and when the MAC PDU bearing the uplink data is greater than the current small data transmission threshold value, transmission cannot be performed in the random access mode, the RRC connection establishment process needs to be triggered, and the uplink data is sent after the RRC connection is established.

UE further determines whether current random access selects a two-step mode or a four-step random access mode according to current channel quality. Specifically, according to a condition of logic channels, corresponding random access modes are determined for different logic channels.

Based on the above method, the communication method of the example of the disclosure further includes:

in response to determining that the logic channel corresponding to the uplink data needs to perform the random access in the two-step random access mode in response to sending the uplink data through the small data sending mechanism in the random access mode, the random access is performed in the two-step random access mode; or in response to determining that the logic channel corresponding to the uplink data does not need to perform the random access in the two-step random access mode, the random access is performed in the four-step random access mode. In other words, it needs to determine whether the current RSRP of the UE meets a threshold requirement configured by a network side, if the RSRP meets the threshold requirement configured by the network side, the UE performs the random access in the two-step random access mode, and the current uplink data is sent through the small data sending mechanism; otherwise, if the RSRP does not meet the threshold requirement configured by the network side, the UE performs the random access in the four-step random access mode, and the current uplink data is sent through the small data sending mechanism.

Based on the above method, the communication method of the example of the disclosure further includes:

a minimum bearing resource of the MAC PDU able to bear the uplink data is selected in response to sending the uplink data through the small data sending mechanism in the random access mode, and a corresponding random access preamble is selected. In the example of the disclosure, after the MAC PDU is determined for the uplink data to be sent, a minimum transmission resource is selected for the determined MAC PDU for bearing, and the corresponding random access preamble is selected, so as to facilitate random access. The UE initiates the random access through the selected corresponding random access preamble.

Based on the above method, the communication method of the example of the disclosure further includes: after the configuration information is received through the RRC message, the configuration information of the broadcast message is ignored in response to determining of entering into the inactive state.

The essence of the technical solution of the example of the disclosure is further illustrated through a specific instance below.

The base stations, in a broadcast, configure following contents:

when the RSRP is greater than −98 db, the data threshold is 100 kb; when the RSRP is less than −98 db and greater than −108 db, the data threshold is 80 kb; and when the RSRP is less than −108 db, the data threshold is 50 kb.

The preambles 1-10 correspond to the small data bearing threshold of 100 kb, the preambles 11-20 correspond to the small data bearing threshold of 80 kb, the preambles 21-30 correspond to the small data bearing threshold of 50 kb, and the preambles 31-40 correspond to the small data bearing threshold of 20 kb.

A logic channel 1 needs the two-step random access, a logic channel 2 does not need the two-step random access, and a logic channel 3 does not need the two-step random access.

A UE A is in the inactive state, at the moment, an RSRP measuring value is −110 db, and then, the data threshold of 50 kb is selected. When the uplink data needs to be transmitted, it needs that the MAC PDU used to send the data is 60 kb, and the UE triggers the RRC connection recovery process.

A UE B is in the inactive state, and may use the two-step random access mode to perform the random access, at the moment, the RSRP measuring value is −110 db, and the data threshold of 50 kb is selected. When the uplink data arrives, it needs that the MAC PDU used to send the data is 10 kb<50 kb, and the UE selects the small data sending mechanism to send the data.

The uplink data comes from the logic channel 1 and the logic channel 2, the logic channel 1 needs the two-step random access, and the two-step random access process is selected. Small data bearing of 20 kb is selected, and then one preamble is selected randomly among the preambles 31-40. The UE initiates the two-step random access process through the selected preamble, and carries the small data bearing of 20 kb in this process.

According to the communication method of the example of the disclosure, the uplink data transmission threshold value under the random access mode related to the channel quality of the UE is configured for the UE, such that the UE with different channel conditions determines the current uplink data bearing volume according to its current communication channel quality, so that the current UE with a good channel quality does not need to enter the RRC connection recovery process due to the slightly large uplink data transmission volume, saving radio resources of the communication system and making the UE save more power.

Figure 4:
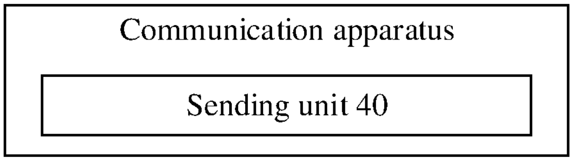
FIG. 4 is a schematic structural diagram of a communication apparatus according to an example.

FIG. 4 is a schematic structural diagram of a communication apparatus according to an example. As shown in FIG. 4, the communication apparatus of the example of the disclosure includes:

a sending unit 40, configured to send configuration information to a UE. The configuration information is configured to indicate at least one of following: a random access mode and a data bearing mode under a random access scenario.

As one implementation, the configuration information is suitable for UE in an inactive state or a connected state.

In one example, the configuration information includes at least one of following:

- a correlation between channel quality and a data threshold value;
- a corresponding relation between a random access preamble and a small data bearing volume; and
- a logic channel adopting a two-step or four-step random access mode.

In one example, the channel quality includes RSRP.

In one example, the sending unit 40 is further configured to:

- send the configuration information through a system broadcast message.

In one example, the sending unit 40 is further configured to:

- send the configuration information to the UE in the connected state through an RRC message.

In an example, the sending unit 40, etc. may be implemented by one or more central processing units (CPUs), graphics processing units (GPUs), base processors (BPs), application specific integrated circuits (ASICs), DSPs, programmable logic devices (PLDs), complex programmable logic devices (CPLDs), field-programmable gate arrays (FPGAs), general-purpose processors, controllers, micro controller units (MCUs), microprocessors, or other electronic elements, may also be implemented by combining with one or more radio frequencies (RFs) and are used to execute the communication method of the above example.

In the example of the disclosure, specific ways, shown in FIG. 4, of operation executed by each unit in the communication apparatus have been described in detail in the example related to the method, which will not be explained and illustrated in detail here.

Figure 5:
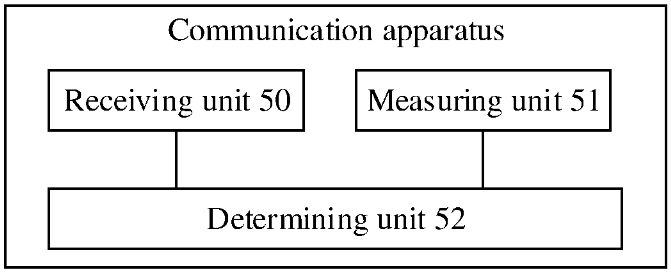
FIG. 5 is a schematic structural diagram of a communication apparatus according to an example.

FIG. 5 is a schematic structural diagram of a communication apparatus according to an example. As shown in FIG. 5, the communication apparatus of the example of the disclosure includes:

- a receiving unit 50, configured to receive configuration information;
- a measuring unit 51, configured to measure channel quality; and
- a determining unit 52, configured to determine, according to the configuration information, a small data transmission threshold value corresponding to the channel quality.

In one example, the apparatus further includes:

- a first determining unit (not shown in FIG. 5), configured to trigger a sending unit in response to determining that an MAC PDU needing to bear uplink data to be transmitted is less than or equal to the small data transmission threshold value; and trigger a connection establishment unit in response to determining that the MAC PDU needing to bear the uplink data is greater than the small data transmission threshold value;
- the sending unit (not shown in FIG. 5), configured to send the uplink data through a small data sending mechanism in a random access mode; and
- the connection establishment unit (not shown in FIG. 5), configured to establish an RRC connection.

In one example, the apparatus further includes: a second determining unit (not shown in FIG. 5) and a random access unit (not shown in FIG. 5);

the second determining unit is configured to trigger, in response to determining that a logic channel corresponding to the uplink data needs to perform random access in a two-step random access mode in response to sending the uplink data by the sending unit through the small data sending mechanism in the random access mode, the random access unit to perform the random access in the two-step random access mode; and trigger, in response to determining that the logic channel corresponding to the uplink data does not need to perform the random access in the two-step random access mode, the random access unit to perform the random access in a four-step random access mode.

In one example, the apparatus further includes:

a selecting unit (not shown in FIG. 5), configured to select a minimum bearing resource of the MAC PDU able to bear the uplink data in response to sending the uplink data through the small data sending mechanism in the random access mode, and select a corresponding random access preamble.

In one example, the random access unit initiates the random access through the selected corresponding random access preamble.

In one example, the receiving unit 50 is further configured to ignore, after receiving the configuration information through an RRC message, configuration information of a broadcast message in response to determining of entering into an inactive state.

In an example, the receiving unit 50, the measuring unit 51, the determining unit 52, the first determining unit, the sending unit, the connection establishment unit, the second determining unit, the random access unit, the selecting unit, etc. may be implemented by one or more central processing units (CPUs), graphics processing units (GPUs), base processors (BPs), application specific integrated circuits (ASICs), DSPs, programmable logic devices (PLDs), complex programmable logic devices (CPLDs), field-programmable gate arrays (FPGAs), general-purpose processors, controllers, micro controller units (MCUs), microprocessors, or other electronic elements, may also be implemented by combining with one or more radio frequencies (RFs) and are used to execute the communication method of the above example.

In the example of the disclosure, specific ways, shown in FIG. 5, of operation executed by each unit in the communication apparatus have been described in detail in the example related to the method, which will not be explained and illustrated in detail here.

Figure 6:
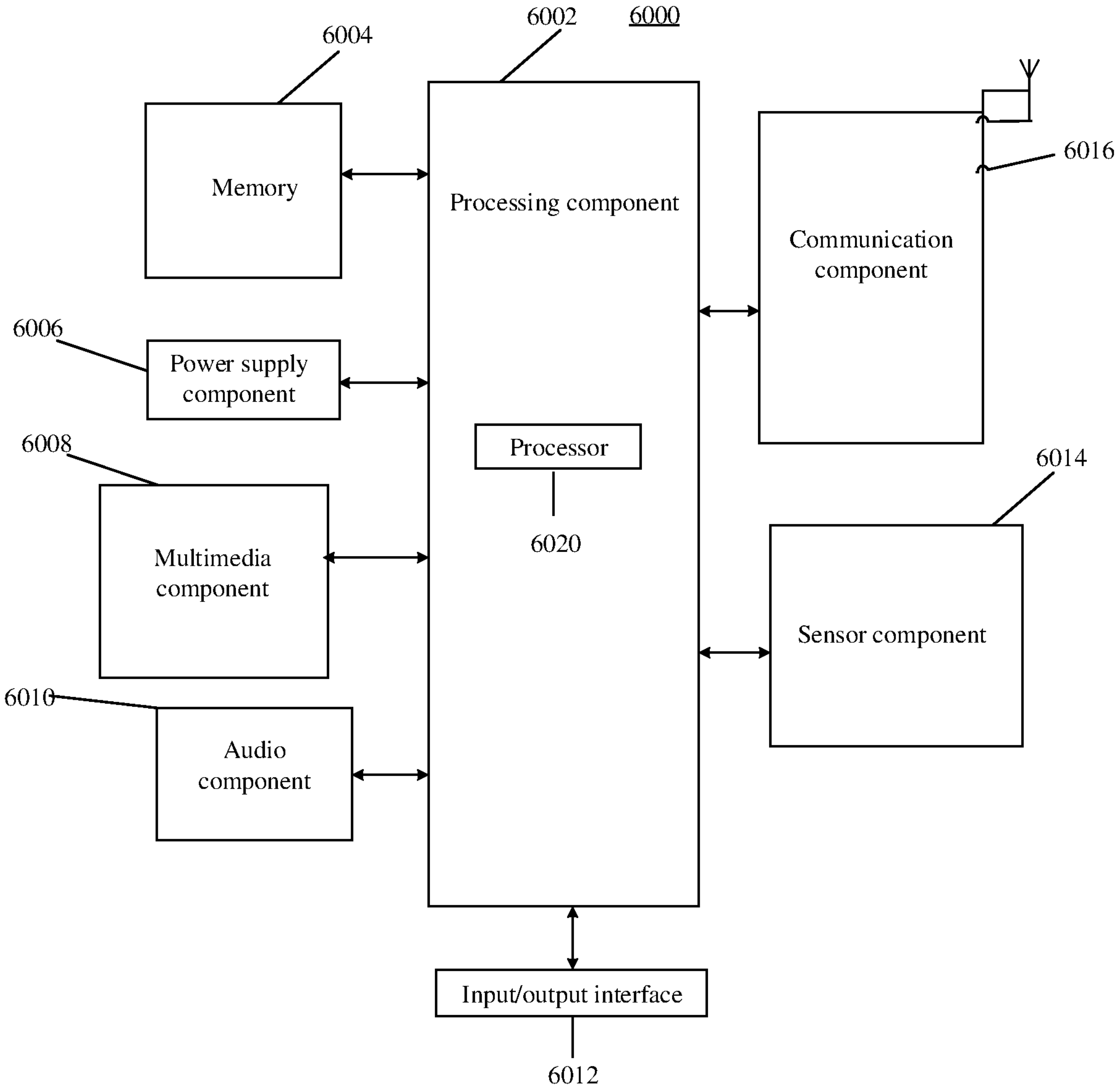
FIG. 6 is a schematic structural diagram of user equipment according to an example.

FIG. 6 is a block diagram of user equipment 6000 according to an example. For example, the user equipment 6000 may be a mobile phone, a computer, digital broadcasting user equipment, a messaging transceiving device, a game console, a tablet device, a medical device, a fitness device, a personal digital assistant, etc.

Referring to FIG. 6, the user equipment 6000 may include one or more of following components: a processing component 6002, a memory 6004, a power supply component 6006, a multimedia component 6008, an audio component 6010, an input/output (I/O) interface 6012, a sensor component 6014, and a communication component 6016.

The processing component 6002 generally controls overall operation of the user equipment 6000, such as the operation associated with display, telephone calls, data communications, camera operations, and recording operation. The processing component 6002 may include one or more processors 6020, to execute instructions to complete all or part of the steps of the above method. In addition, the processing component 6002 may include one or more modules, to facilitate interaction between the processing component 6002 and other components. For example, the processing component 6002 may include a multimedia module, to facilitate the interaction between multimedia component 6008 and the processing component 6002.

The memory 6004 is configured to store various types of data to support operation on the user equipment 6000. Instances of the data include instructions for any application or method used to operate on the user equipment 6000, such as contact person data, phone book data, messages, pictures, videos, etc. The memory 6004 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk or an optical disc.

The power supply component 6006 provides power for various components of the user equipment 6000. The power supply component 6006 may include a power supply management system, one or more power supplies, and other components associated with generating, managing, and distributing power for the user equipment 6000.

The multimedia component 6008 includes a screen that provides an output interface between the user equipment 6000 and a user. In some examples, the screen may include a liquid crystal display (LCD) and a touch panel (TP). If the screen includes the touch panel, the screen may be implemented as a touch screen, to receive input signals from the user. The touch panel includes one or more touch sensors to sense touch, slide, and gestures on the touch panel. The touch sensors may not only sense boundaries of a touch or slide action, but also further detect duration and pressure associated with the touch or slide operation. In some examples, the multimedia component 6008 includes a front camera and/or a rear camera. When the user equipment 6000 is in an operation mode, such as a shooting mode or a video mode, the front camera and/or the rear camera may receive external multimedia data. Each of the front camera and the rear camera may be a fixed optical lens system or has a focal length and an optical zoom capability.

The audio component 6010 is configured to output and/or input audio signals. For example, the audio component 6010 includes a microphone (MIC), configured to receive external audio signals when the user equipment 6000 is the operation mode, such as a call mode, a recording mode, and a speech recognition mode. The received audio signals may be further stored in the memory 6004 or sent via the communication component 6016. In some examples, the audio component 6010 also includes a speaker, configured to the output the audio signals.

The I/O interface 6012 provides an interface between the processing component 6002 and a peripheral interface module, and the peripheral interface module may be a keyboard, a click wheel, buttons, etc. The buttons may include, but not limited to, a home button, a volume button, a start button, and a lock button.

The sensor component 6014 includes one or more sensors, configured to provide status assessment of all aspects for the user equipment 6000. For example, the sensor component 6014 may detect an on/off state of the user equipment 6000, and relative positioning of components, for example, the components are a display and a keypad of the user equipment 6000, and the sensor component 6014 may also detect a position change of the user equipment 6000 or one component of the user equipment 6000, presence or absence of contact of the user and the user equipment 6000, an orientation or acceleration/deceleration of the user equipment 6000 and a temperature change of the user equipment 6000. The sensor component 6014 may include a proximity sensor, configured to detect presence of nearby objects without any physical contact. The sensor component 6014 may also include optical sensors such as a CMOS or CCD image sensor used in imaging applications. In some examples, the sensor component 6014 may also include an acceleration sensor, a gyroscope sensor, a magnetic sensor, a pressure sensor or a temperature sensor.

The communication component 6016 is configured to facilitate wired or wireless communication between the user equipment 6000 and other devices. The user equipment 6000 may access wireless networks based on communication standards, such as Wi-Fi, 2G or 3G, or their combination. In an example, the communication component 6016 receives a broadcast signal or broadcast-related information from an external broadcast management system via a broadcast channel. In an example, the communication component 6016 also includes a near-field communication (NFC) module to facilitate short-range communication. For example, the NFC module may be implemented based on a radio frequency identification (RFID) technology, an infrared data association (IrDA) technology, an ultra wideband (UWB) technology, a Bluetooth (BT) technology and other technologies.

In an example, the user equipment 6000 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components, which is configured to execute the above communication method.

In an example, a non-transitory computer readable storage medium including instructions is also provided, such as the memory 6004 including the instructions. The instructions may be executed by the processor 6020 of the user equipment 6000 to complete the above communication method. For example, the non-transitory computer readable storage medium may be an ROM, a random access memory (RAM), a CD-ROM, a magnetic tape, a floppy disk and an optical data storage device An example of the disclosure further describes a network device, including a processor, a transceiver, a memory and an executable program stored on the memory and able to be operated by the processor, and the processor, when operating the executable program, executes steps of the communication method of the above example.

An example of the disclosure further describes a user equipment, including a processor, a transceiver, a memory and an executable program stored on the memory and able to be operated by the processor, and the processor, when operating the executable program, executes steps of the communication method of the above example.

An example of the disclosure further describes a non-transitory storage medium, on which an executable program is stored, and the executable program, when executed by a processor, implements steps of the communication method of the above example.

Those skilled in the art will easily think of other implementation solutions of examples of the disclosure after considering the specification and practicing the disclosure disclosed here. The disclosure is intended to cover any variation, use or adaptive changes of the examples of the disclosure, the variation, use or adaptive changes follow general principles of the examples of the disclosure and include common knowledge or customary technical means in the technical field not disclosed by the examples of the disclosure. The specification and the examples are regarded as instances.

It needs to be understood that the examples of the disclosure are not limited to precise structures which have been described above and shown in the accompanying drawings, and various modifications and changes may be performed on the examples without departing from the scope of the examples.

What is claimed is:

1. A communication method, applied to a base station side, and comprising:

sending configuration information to a user equipment (UE), the configuration information being configured to indicate small data transmission threshold values and random access modes corresponding to different channel qualities, wherein the small data transmission threshold values are compared with uplink data of a bearer to be transmitted, the uplink data is sent through a small data sending mechanism in a two-step random access mode in a case where the uplink data of the bearer to be transmitted is less than or equal to a small data transmission threshold value corresponding to a reference signal receiving power (RSRP) measured by the UE and the RSRP meets a first threshold configured by the base station side, the uplink data is sent through a small data sending mechanism in a four-step random access mode in a case where the uplink data of the bearer to be transmitted is less than or equal to a small data transmission threshold value corresponding to a RSRP measured by the UE and the RSRP does not meet the first threshold configured by the base station side, and a radio resource control (RRC) connection establishment process is triggered in a case where the uplink data of the bearer to be transmitted is greater than the small data transmission threshold value corresponding to the RSRP measured by the UE.

2. The method according to claim 1, wherein the configuration information is suitable for UE in an inactive state or a connected state.

3. The method according to claim 1, wherein the configuration information comprises at least one of:

a correlation between the RSRP and a data threshold value;

a corresponding relation between a random access preamble and a small data bearing volume; or a logic channel adopting a two-step or four-step random access mode.

4. The method according to claim 1, wherein sending the configuration information, comprises:

sending the configuration information through a system broadcast message.

5. The method according to claim 1, wherein sending the configuration information, comprises:

sending the configuration information to the UE in a connected state through a radio resource control (RRC) message.

6. A non-transitory storage medium having stored thereon an executable program that, when executed by a processor, causes the processor to perform the method according to claim 1.

7. A communication method, applied to a user equipment (UE) side, and comprising:

receiving configuration information, the configuration information being configured to indicate small data transmission threshold values and random access modes corresponding to different channel qualities;

measuring channel quality;

determining, according to the configuration information, a small data transmission threshold value corresponding to the channel quality;

in response to determining that uplink data of a bearer to be transmitted is less than or equal to the small data transmission threshold value corresponding to a reference signal receiving power (RSRP) measured by the UE and the RSRP meets a first threshold configured by the base station side, sending the uplink data through a small data sending mechanism in a two-step random access mode;

in response to determining that the uplink data of the bearer to be transmitted is less than or equal to a small data transmission threshold value corresponding to a RSRP measured by the UE and the RSRP does not meet the first threshold configured by the base station side, sending the uplink data through a small data sending mechanism in a four-step random access mode; and in response to determining that the uplink data of the bearer is greater than the small data transmission threshold value corresponding to the RSRP measured by the UE, triggering a radio resource control (RRC) connection establishment process.

8. The method according to claim 7, further comprising one of:

determining that a bearer carrying the uplink data needs to perform random access in a two-step random access mode in response to sending the uplink data through the small data sending mechanism in the random access mode and performing the random access in the two-step random access mode; or determining that the bearer carrying the uplink data does not need to perform the random access in the two-step random access mode and performing the random access in a four-step random access mode.

9. The method according to claim 7, further comprising:

selecting a minimum resource to transmit the uplink data in response to sending the uplink data through the small data sending mechanism in the random access mode, and selecting a corresponding random access preamble.

10. The method according to claim 9, further comprising:

initiating the random access through the selected corresponding random access preamble.

11. The method according to claim 7, further comprising:

ignoring, after receiving the configuration information through a radio resource control (RRC) message, configuration information of a broadcast message in response to determining of entering into an inactive state.

12. A user equipment, comprising:

a processor;

a transceiver; and a memory storing an executable program, wherein the processor is configured to perform the method according to claim 7.

13. A non-transitory storage medium having stored thereon an executable program that, when executed by a processor, causes the processor to perform the method according to claim 7.

14. A network device, comprising:

a processor;

a transceiver; and a memory storing an executable program, wherein the processor is configured to:

send configuration information to a user equipment (UE), the configuration information being configured to indicate small data transmission threshold values and random access modes corresponding to different channel qualities, wherein the small data transmission threshold values are compared with uplink data of a bearer to be transmitted, the uplink data is sent through a small data sending mechanism in a two-step random access mode in a case where the uplink data of the bearer to be transmitted is less than or equal to a small data transmission threshold value corresponding to a reference signal receiving power (RSRP) measured by the UE and the RSRP meets a first threshold configured by the base station side, the uplink data is sent through a small data sending mechanism in a four-step random access mode in a case where the uplink data of the bearer to be transmitted is less than or equal to a small data transmission threshold value corresponding to a RSRP measured by the UE and the RSRP does not meet the first threshold configured by the base station side, and a radio resource control (RRC) connection establishment process is triggered in a case where the uplink data of the bearer to be transmitted is greater than the small data transmission threshold value corresponding to the RSRP measured by the UE.

15. The network device according to claim 14, wherein the configuration information is suitable for UE in an inactive state or a connected state.

16. The network device according to claim 14, wherein the configuration information comprises at least one of:

a correlation between the RSRP and a data threshold value;

a corresponding relation between a random access preamble and a small data bearing volume; or a logic channel adopting a two-step or four-step random access mode.

17. The network device according to claim 14, wherein the processor is further configured to:

send the configuration information through a system broadcast message.

18. The network device according to claim 14, wherein the processor is further configured to:

send the configuration information to the UE in a connected state through a radio resource control (RRC) message.

* * * * *